R. K. MASON.
SAFETY SWITCH.
APPLICATION FILED JULY 8, 1919.

1,424,578.

Patented Aug. 1, 1922.
6 SHEETS—SHEET 1.

Inventor
R. K. Mason

By H. B. Willson &co
Attorneys

R. K. MASON.
SAFETY SWITCH.
APPLICATION FILED JULY 8, 1919.

1,424,578.

Patented Aug. 1, 1922.
6 SHEETS—SHEET 2.

Inventor
R. K. Mason
By H. R. Williston & Co.
Attorneys

UNITED STATES PATENT OFFICE.

RALPH K. MASON, OF BANTAM, CONNECTICUT, ASSIGNOR OF ONE-HALF TO JOHN H. LANCASTER, OF LITCHFIELD, CONNECTICUT.

SAFETY SWITCH.

1,424,578.  Specification of Letters Patent.  Patented Aug. 1, 1922.

Application filed July 8, 1919. Serial No. 309,280.

*To all whom it may concern:*

Be it known that I, RALPH K. MASON, a citizen of the United States, residing at Bantam, in the county of Litchfield and State of Connecticut, have invented certain new and useful Improvements in Safety Switches; and I do declare the following to be a full, clear, and exact description of the invention, such as will enable others skilled in the art to which it appertains to make and use the same.

My invention relates to that class of electric switches which are inaccessible for renewing fuses, making repairs, etc., except when a normally closed or locked door is opened. Switches of this character have heretofore been in use but in a number of instances have proven to be inefficient or undesirable, due principally to complex construction and liability of touching live parts even when the switch is in the open position, in which it is intended in the present invention that no possibility of electric shock shall exist.

My invention has for its principal object to generally improve upon safety switches of the above mentioned type, to such an extent as to not only greatly simplify their construction, but to render it impossible to touch any live parts when the door is opened for replacing blown fuses, or for other purposes.

Another object is to provide novel means for locking the door closed until the switch is entirely opened, and for preventing closing of the switch until the door is closed.

A still further object is to provide a novel quick break switch which will insure that the operator shall not leave the switch contacts incompletely engaged or disengaged, thereby eliminating all possibility of arcing and heating of the contacts.

Yet another object is to make novel provision for proper interfitting of the switch contacts, regardless of irregularities in manufacture or in the movement of the carrying member of the movable contacts.

With the foregoing in view, the invention resides in the novel construction and combination, arrangement of parts hereinafter fully described and claimed, and shown in the accompanying drawings which form a part of this application.

Fig. 8 is an end elevation of the switch shown in Fig. 7, parts being broken away and in section.

In the drawings above briefly described, the numeral 1 designates a suitable container or casing which is preferably of rectangular formation to economize in space, said casing having a cover or door 2 which may be opened for renewing fuses, making repairs and the like. The door in the present arrangement, forms the front of the casing 1, and is disposed in advance of a false front 3 having an opening 4. One edge of the door 2 is hinged at 5 while apertured ears 6 may be provided at the other edge thereof for receiving a suitable seal (not shown). The features so far described are preferably the same in all forms of the invention, while the parts contained in the casing may vary as hereinafter described.

In Figs. 1 to 8 of the drawings, I have shown fixed and movable bases 7 and 8 respectively, the base 7 being secured in the rear of the casing in any preferred manner, while base 8 is positioned in advance of said base 7. The two bases are preferably parallel, but this is not absolutely essential. The fixed base 7 carries wire connecting posts 9 while the movable base 8 is provided with fuse clips or the like 10 carrying one or more fuses 11, according to requirements, and needless to say both bases may be formed of any suitable insulating material or in other ways insulated where required. The parts 11 may of course be circuit cutout means of any suitable type.

Figure 1:
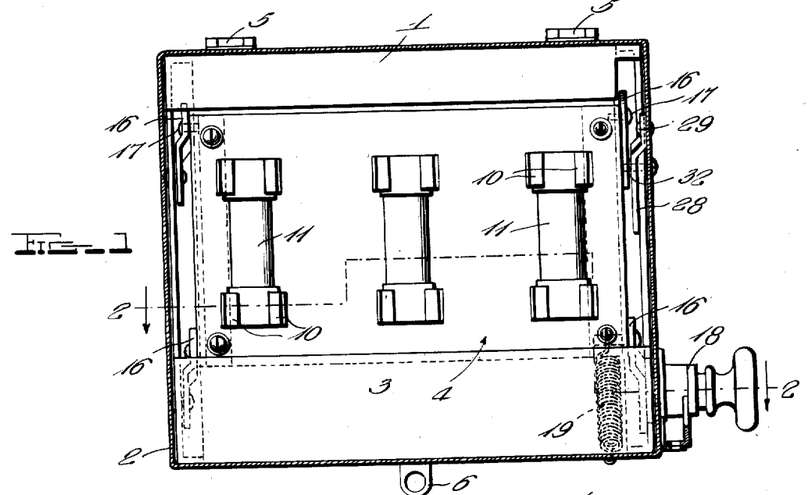
Figure 1 is a front elevation of a safety switch constructed in accordance with my invention, with the door thereof in section.
Figure 2:
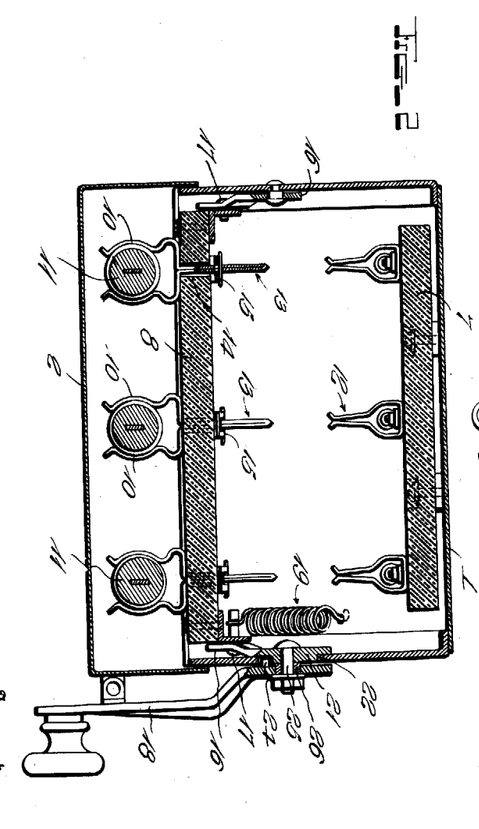
Fig 2 is a horizontal section on the plane indicated by line 2—2 of Fig. 1.
Figure 3:
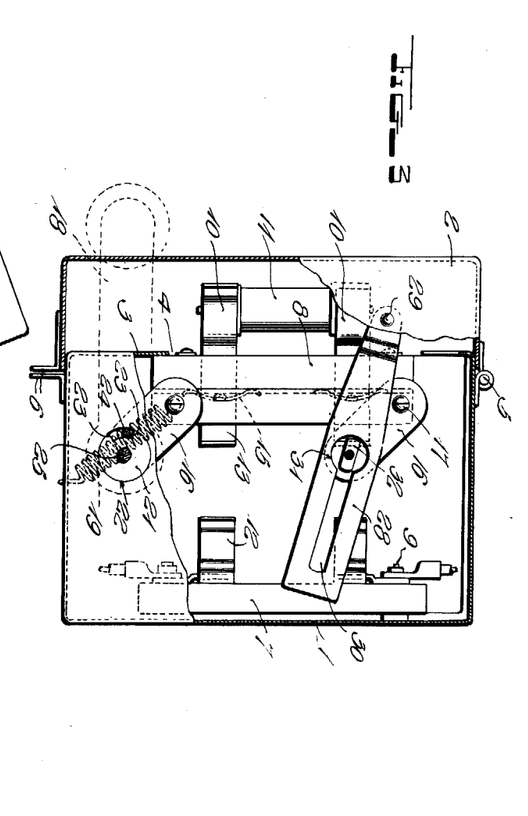
Fig. 3 is an end elevation with parts broken away and in section, showing the switch in open position and the door locking means released.
Figure 4:
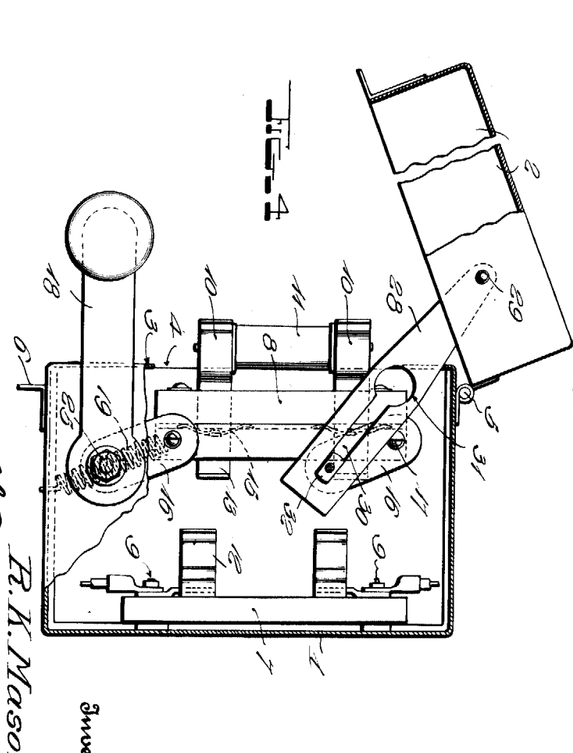
Fig. 4 is a view similar to Fig. 3 showing the manner in which the door may be opened when the switch is released, likewise illustrating the manner of preventing closing of the switch until the door is closed.
Figure 5:
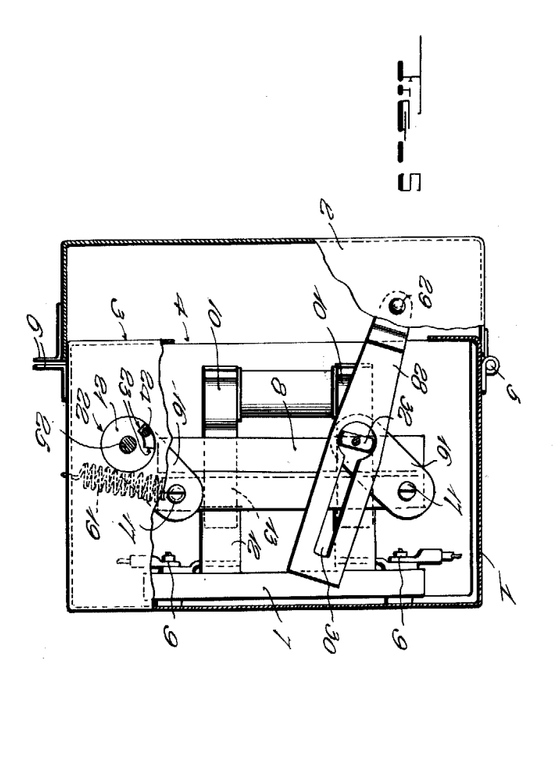
Fig. 5 is substantially a duplicate of Figs. 3 and 4 but illustrating the way in which the door is locked in closed position when the switch is closed.

Between the fixed and movable bases 7 and 8, switch means is provided, said means being shown as consisting of interfitting contacts 12 and 13. The contacts 12 are shown carried by the base 7 and consisting of spring clips with which the binding posts 9 are electrically connected, while the contacts 13 are illustrated as formed of switch blades designed for reception in the clips 12. The blades 13 are preferably formed as an integral part of the fuse clips 10 so that these parts and the fuse may form the bridge member of the double break switch. The blades 13 are by preference movably received in openings 14 in the base 8, appropriate springs 15 being provided to normally hold the clips 10 and blades 13 against shifting, but to permit them to shift laterally for proper engagement with the clips 12, in case of any inaccuracies in manufacture or irregularities in the travel of the movable base 8. The springs 15 are here shown as bowed leaf springs having their ends slidably engaged with the base 8 and their central portions apertured to receive the contacts or blades 13, the springs being retained in position by transverse pins in the blades as shown in Fig. 2. This shiftable mounting of one set of switch contacts is important since it insures the proper surface engagement of cooperating contacts and hence establishes the proper electrical connection so that heating and burning of such contacts is prevented.

It will be seen that the switch comprises two relatively movable sets of make-and-break contact members, one set being preferably fixed on suitable insulating means in the container or casing and preferably on its bottom, while the other set is carried by the movable base or carrier 8, the "line" and "load" connections being made to one set of contacts while the fuses or circuit interrupters 11 being suitably connected to the other set.

The movable base 8 may be mounted and operated in any suitable manner and when said base is shifted toward the base 7, the contacts 12 and 13 are interengaged so that the switch is closed, and I have provided a novel arrangement of parts for locking the door 2 against opening when the base 8 is in switch closing position, or for releasing the door when said base is shifted to a position to open the switch. Before describing this locking means however it will be well to explain the mounting and operating means for the moving section of the switch, that is the fuse carrying base 8 and its contacts 13.

In the present embodiment of the invention, I have shown a plurality of links pivoted at one end to the casing and at their other ends to the base 8, and an operating handle is provided for at least one of these links so that when it is shifted, the base may be moved to either switch opening or closing position. In Figs. 1 to 6, two pairs of straight links 16 are shown, having one end pivoted at 17 to the moving base 8, while the other end of said links are pivoted in any appropriate manner to the casing or possibly to fixed brackets or posts in said casing. This parallel link structure forms the sole means for supporting the movable switch base or carrier 8 and for holding it against angling, causing the same to move forwardly and rearwardly in parallel relation to the fixed base and to the inturned marginal portions of the casing which form the casing front. Any lateral movement of the carrier 8 is compensated for by the shiftable contacts 13 which move bodily as a unit on the carrier and to either side of the central plane of the coacting contacts. Consequently there will always be true relative positioning of the fixed and movable contacts when the switch is closed and effective electrical connections are thus established. One of the links 16 is provided with an operating handle 18 located on the exterior of the casing 1 and in order that this handle need not necessarily be moved to its limit in either direction, to open or close the switch, I provide means for rapidly completing the movement of the base 8 when it is started in either direction by the handle 18, thus forming a quick make and quick break switch which cannot possibly be left in either partly closed or partly opened position, thereby preventing any liability of arcing or heating the switch contacts. In the present embodiment of the invention, I have shown the motion completing means of the base 8 as consisting of a double acting coil spring 19 connected at one end either to the handle equipped link 16 or to the base 8, while the other end of said spring is anchored to the casing. The spring 19 thus operates to rapidly continue the movement of the links 16 and the base 8 when these parts are moved by the handle 18, sufficiently to shift said spring past dead center. While this type of spring is preferred, others could of course be used.

In order that the spring 19 or other motion completing means may act without overcoming the inertia of the handle 18, it is highly desirable to provide for lost motion between said handle and the link 16 to which it is connected, and although this could be accomplished in a number of ways, I preferably provide the link in question with a hub 21 rotatable in an opening 22 in the side of the casing, said hub having a notch whose ends form circumferentially spaced shoulders 23. The handle 18 is provided with a projection 24 received between the shoulders 23 for contact with either one thereof when either opening or closing the switch. A bolt or the like 25 preferably passes through the handle 18, the hub 21, and the link 16 equipped with said hub, thus tying the several parts together, but a suitable space 26 is employed to prevent frictional binding of the handle against the hub by said bolt.

By the arrangement just described, after the handle has been operated to shift the several links 16 and the base 8 in either direction, sufficiently to bring the spring or the like 19 past dead center, said spring or the like will immediately come into action and will continue moving said links and base to completely open or closed position. The previously inactive shoulder 23 merely moves toward the projection 24 during this operation and consequently it is not necessary that the spring or other device employed shall move the handle and the operator's hand thereon.

Figure 7:
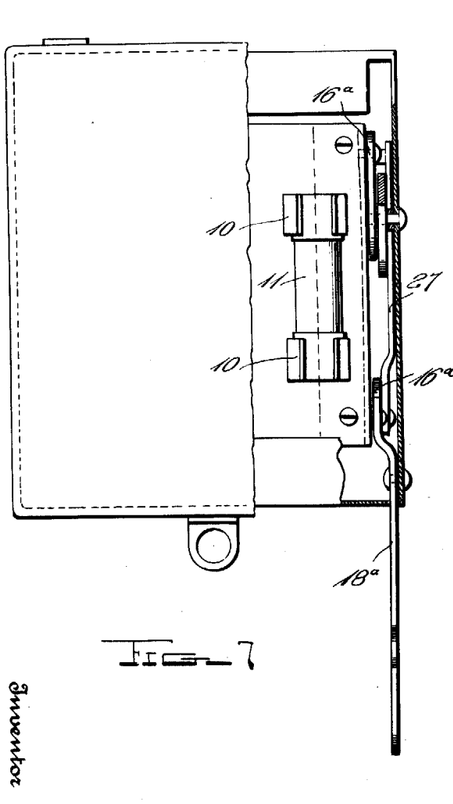
Fig. 7 is a front elevation partly in section, showing a modified form of construction.
Figures 10, 11:
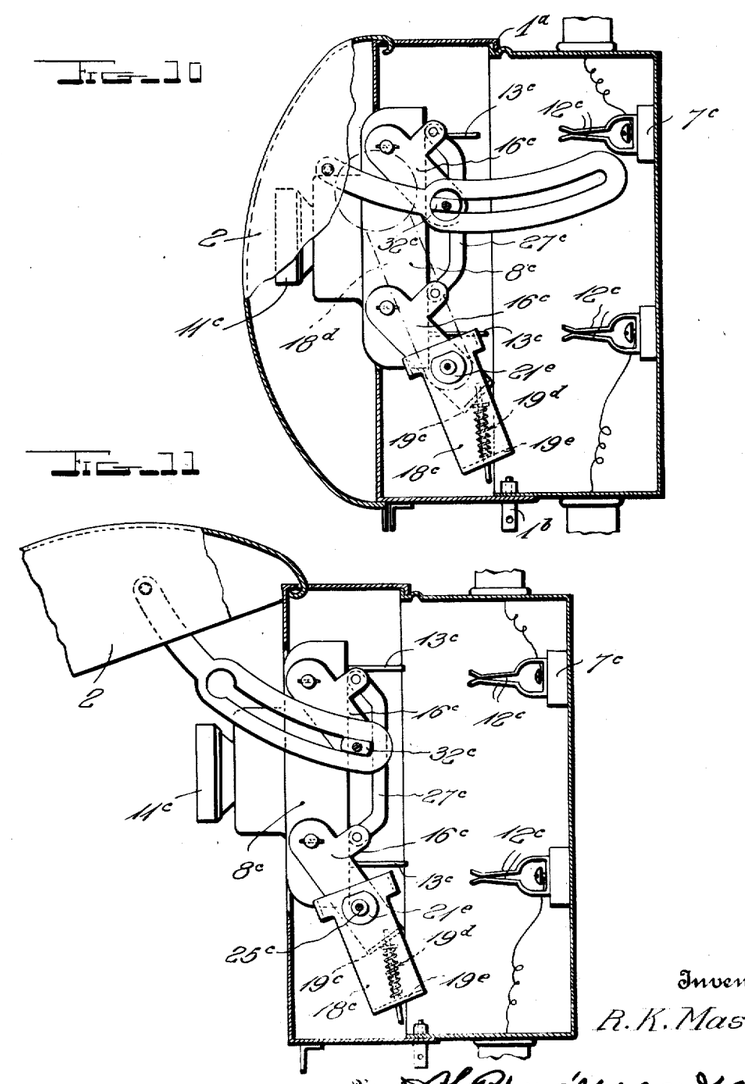
Fig. 10 is an end elevation with parts broken away and in section showing a further modification of the invention, the switch being shown in off position to allow opening of the door for re-fusing.
Fig. 11 is a duplicate of Fig. 10 with the exception that it illustrates the cover in open position.
Figure 12:
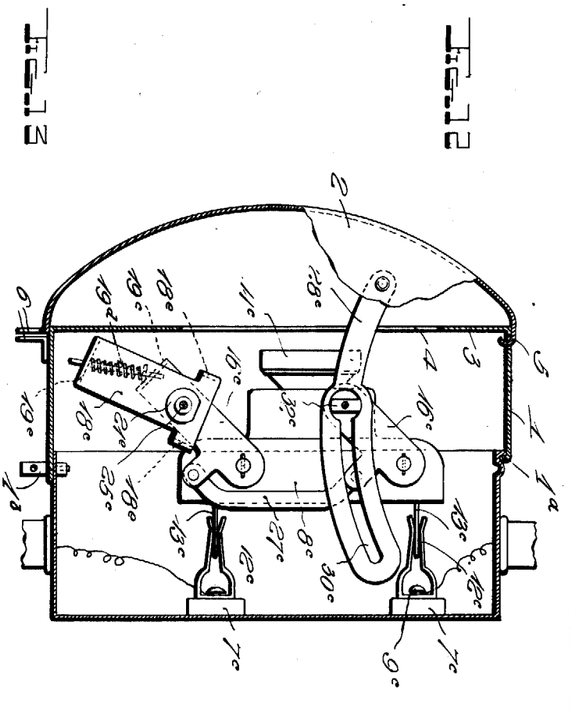
Fig. 12 is another vertical section showing the switch locked in closed position.
Figure 13:
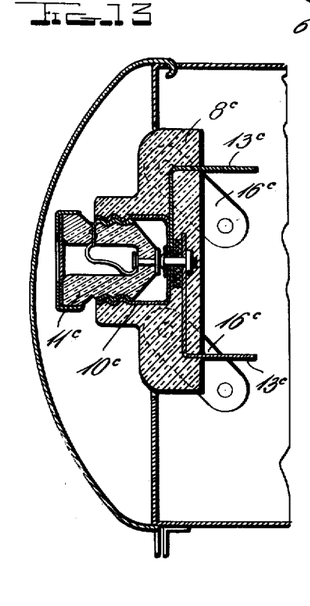
Fig. 13 is a detail vertical section illustrating the manner in which plug fuses may be employed.
Figure 14:
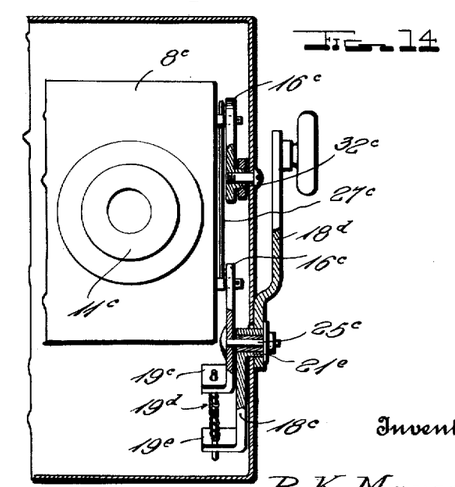
Fig. 14 is a front elevation of a portion of the construction shown in Figs. 10 to 13, with the hinged cover removed and with parts in section.

Figs. 7 and 8 illustrate different forms of links 16ª for mounting the base 8 but their action is the same as the links above described. Instead of providing one of these links with a handle such as 18 however, it is equipped with a handle 18ª which is rigid therewith and may be formed integral with the link if desired. Figs. 7 and 8 illustrate another departure from the preceding figures, in that the upper and lower links 16ª are linked together at 27 and the spring 19 is omitted. The link 27 insures proper simultaneous movement of the links 16ª and if desired a similar link might be employed in connection with the form of the device previously described. While the spring 19 is eliminated from the construction shown in Figs. 7 and 8, it might be used if found desirable.

I provide a novel means for locking the door 2 in closed position until the movable section of the switch (the fuse carrying base 8 and the switch means carried thereby) is moved to switch opening position, and for then allowing free opening of said door. The preferred embodiments of this locking means are shown, but others might be used. A suitable link 28 is pivoted at 29 to the door 2 and is positioned adjacent one end of the base 8, said link being of any suitable size and shape, two different shapes being illustrated for instance in Figs. 5 and 8. The link 28 is provided with a longitudinal slot 30 having an enlargement 31 at one end, and one or more projections on the adjacent link 16 or 16ª, coact with said slot and its enlargement to control the opening and closing of the door. In Figs. 1 to 6, the link 16 in question is provided with a single projecting lug 32 elongated and normally located in the enlargement 31 of the slot 30 as clearly seen in Fig. 5. Since the link 28 cannot then shift forwardly, the door 2 cannot be opened, this relation of parts existing when the switch is closed. When the movable base 8 is shifted completely to switch opening position however, the lug 32 is disposed for reception in the longitudinal part of the slot 30 as fully disclosed in Fig. 3. The door 2 may then be opened to give access to the fuses 11 for renewing them or for making any necessary repairs on the fuse clips or adjacent parts. It will be observed by reference to Fig. 4 that when the base 8 is in switch opening position, it is located at the opening 4 and forms a complete barrier to prevent any possibility of touching the binding posts 9 and the contacts 12. Furthermore, the switch cannot be closed until the door is closed, since the head 32 cannot turn in the longitudinal part of the slot 30, and holding of said lug against turning, similarly holds the link 16 and the base 8 against movement. There is thus no possibility whatever of shock while renewing fuses or otherwise working upon the movable base 8, this being not only due to the construction and arrangement of the door locking means, but to the fact that I employ a double break switch. When only a single break switch is used in safety switches, the fuse and its clips are not dead when the switch is opened, if the lead or line wires have been connected to the improper binding posts, as often occurs.

In Figs. 7 and 8, instead of employing a single lug such as 32, I provide a plurality of lugs 32ª which normally stand in the enlargement 31 of the slot 30 and prevent opening of the door, but are positioned for reception in the remainder of said slot when the switch is completely opened. Although I have shown a plurality of lugs 32$^a$, one lug eccentrically located might be relied upon to perform the same function.

Figures 6, 9:
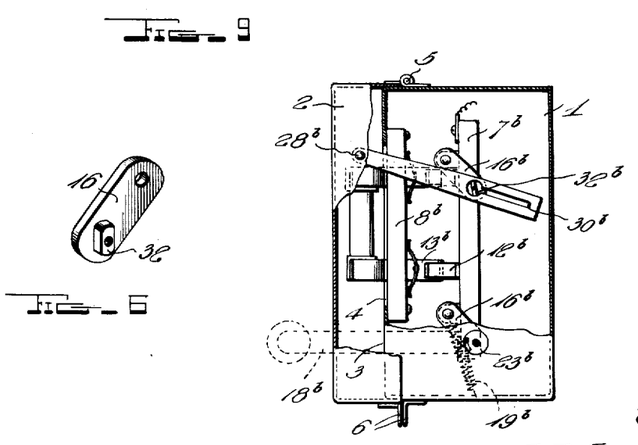
Fig. 6 is a detail perspective view of one of the links employed for mounting the carrying member or base of the movable contacts, and the locking means for the door carried by said link.
Fig. 9 is an end elevation partly in section of a switch employing an approximate reversal of the switch parts shown in the preceding figures.
Figure 6:
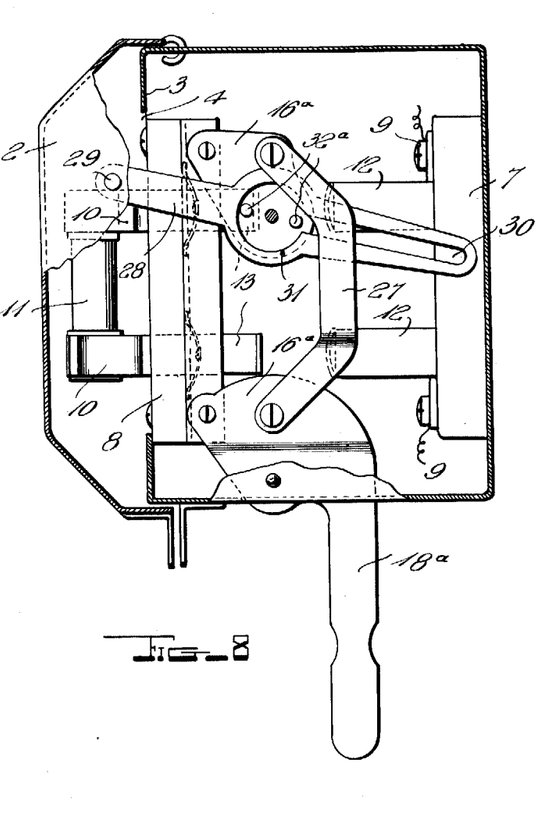

In Fig. 9 I have illustrated a reversal of parts. In this figure, a fuse carrying base 8$^b$ is fixedly mounted at the opening 4 and a base 7$^b$ carrying the binding posts is mounted on pivoted links 16$^b$ or other preferred means, for movement toward and away from the base 8$^b$ to engage and disengage the interfitting contacts 12$^b$ and 13$^b$. One of the links 16$^b$ is provided with a handle 18$^b$, a spring or the like 19$^b$ is shown for performing the same function as the spring 19, and suitable means 23$^b$ is illustrated to allow lost motion between the handle and the base 7$^b$. Another of the links 16$^b$ is provided with a lug 32$^b$ operating in a slot 30$^b$ in a link 28$^b$ which is connected to the door 2. The operation of all of these parts is the same as the corresponding parts described and I have merely included Fig. 9 to illustrate the manner in which practically the same results can be obtained by approximately reversing the form of construction above described.

Figs. 10 to 14 illustrate the manner in which plug fuses may be employed instead of the cartridge fuses shown in the preceding figures and also disclose several of the other features constructed in a somewhat different manner. The movable base 8$^c$ is mounted on parallel links 16$^c$ which are pivoted thereto at one end and to the sides of the casing 1 at their other ends, said base being provided with sockets 10$^c$ into which plug fuses 11$^c$ are threaded to electrically connect the switch blades 13$^c$ which are partly embedded in or otherwise carried by the base. The blades 13$^c$ coact with contact clips 12$^c$ insulated from the casing as seen at 7$^c$ and provided with binding posts 9$^c$.

One of the links 16$^c$ is provided with a lug 32$^c$ operating in a slot 30$^c$ in a link 28$^c$, said link and slot being identical with the link 28 and slot 30, with the exception that they are curved sufficiently to prevent turning of the lug 32$^c$ and consequent swinging of the links 16$^c$, when the door 2 is opened. The links 16$^c$ may well be tied together by a connecting link 27$^c$ which serves to relieve the base 8$^c$ of some strain when the one set of links must be operated from the other.

One of the links 16$^c$ is bent laterally at its lower end at 19$^c$ and abuts one end of a coil spring 19$^d$, and the other end of said spring bears against the lateral end 19$^e$ of an arm 18$^c$ within the casing and is connected with the handle 18$^d$ to be moved thereby. Either a direct connection may be established between the handle and the arm 18$^c$, for instance by passing the flat sided lug 21$^e$ through an opening in the handle, or some suitable connection may be employed between said handle and arm to allow lost motion between them. When the lug 21$^e$ is employed, it may well pass rotatably through an opening in the casing and form a pivot for the parts 18$^c$, 18$^d$, and the adjacent link 16$^c$. A bolt 25$^c$ may pass through the lug 21$^e$ and the aforesaid link 16$^c$ for tying the several parts together as seen clearly in Fig. 14.

The arms 18$^c$ and the spring 18$^d$ establish a spring connection between the handle 18$^d$ and the links 16$^c$ and such connection serves to quickly open or close the switch when the handle moves the arm 18$^c$ sufficiently to place the spring 19$^d$ under tension and to shift it beyond dead center. In case the contacts 13$^c$ and 12$^c$ should bind, and prevent the spring 19$^d$ from quickly opening the switch, a further movement of the handle 18$^d$ will bring one of the lugs 18$^e$ into contact with the adjacent link 16$^c$, so that the switch may be positively operated. The lugs 18$^e$ are formed on the arm 18$^c$ and straddle the aforesaid link 16$^c$.

In Figs. 10 to 13 the casing 1 is formed of front and rear sections for ease of assembly and installation and this feature may be followed in connection with all other forms of the switch. The two sections may be provided at one side with interhooking flanges 1$^a$ and with a screw or other fastener 1$^b$ at their opposite side. This fastener may be sealed against release if desired.

By providing this detachable connection, it will be seen that the rear section of the casing may be built into a building structure substantially flush with its surface, during construction of the building and that after completion of such building, the front section of the casing with the switch mechanism and cover may be readily applied to the rear section to complete installation. Thus, the building contractor is saved the possibility of having the switch mechanism stolen or damaged during erection of the building.

In general, the operation of the construction just described is the same as that above explained, and further explanation need not therefore be given.

When any form of the switch is in closed and locked position, the current will pass freely therethrough without any danger whatever of injuring persons walking around the switch, since it is impossible for them to touch any live parts. Furthermore, injury cannot result from opening the door 2, since in order to open said door, the switch must first be moved to completely open position.

In all forms of the invention, the fuse carrying base prevents access to the other base carrying the live wires and contacts, and there is no possibility whatever of receiving a shock from the fuses or the fuse clips, due to the double break nature of the switch.

Furthermore, when the casing door is open, not only is it impossible to touch live parts, but no switch operating parts can be actuated to close the switch. This is of great advantage over devices heretofore in use. It will thus be seen that the device is in all means a safety switch and that there is no liability whatever of injury therefrom. It will be further noted that when the movable base or carrier 8 is projected to open the switch, the fuses or automatic cut-out are projected exteriorly of the body of the container or casing and hence may be readily inspected and replaced.

I have shown several embodiments of the invention but it will of course be understood that it may be manufactured in numerous other forms. Furthermore, the different distinctive features of the several forms shown are not restricted to use in connection with the other arrangements disclosed in connection therewith, but the corresponding features of the different forms of the invention may be interchangeably used as occasion may dictate, and it is to be understood that my invention is not restricted to any of the features of construction shown, except as specified in the appended claims.

I claim:

1. In a safety switch, a casing having an opening in its front, a fixed base in the rear portion of said casing having binding posts and switch contacts, a movable base in the front portion of such casing parallel with said fixed base, switch blades on the rear side of said movable base and fuse holding means on the front side thereof, a pair of parallel links at each end of said movable base and pivoted thereto at one end on laterally spaced axes, the other ends of said links being pivoted to opposite sides of said casing, on similarly spaced axes, a handle on the exterior of the casing connected with one of said links for moving said movable base rearwardly to "on" position and forwardly to "off" position, said movable base closing said front opening and forming a barrier to all live parts when in the latter position, a hinged door normally closed over said casing front, and said fuse holding means, a link pivoted to said door and extending into the casing, said link having a longitudinal slot enlarged at its front end, and a door locking lug on one of the first named links received in said slot enlargement when the door is closed and the switch is in "on" position, said lug being disposed for sliding but non-rotating reception in the remainder of said slot when the movable base is shifted to "off" position.

2. In a switch, a casing, fixed and movable switch sections in said casing, parallel links pivoted to said casing at one end on laterally spaced axes and pivoted on similarly spaced axes to said movable switch section at their other ends, one of said links having a hub rotatable in an opening in the casing, said hub having spaced shoulders, a pivoted handle on the exterior of the casing, mounted on said hub and having a projection movable between said shoulders for contact therewith to shift said one link and thereby move said movable switch member to open or closed position, and a double acting spring acting on said one link and active on either side of its dead center for rapidly completing the movement thereof in either direction after starting of said link by said handle.

3. A structure as specified in claim 1, together with connecting means between said handle and the adjacent link for allowing lost motion between them, and a coiled spring acting on this link and active on either side of its dead center to quickly operate all parts after initial starting by said handle.

4. In a switch, the combination with a container having a substantially open front and a cover portion adapted to be opened and closed, of switch mechanism in the container comprising relatively movable make-and-break contact members, a movable insulating carrier for one contact member, and a cut-out on said carrier adapted to be exposed when the cover is open, said carrier being of a size and shape to alone cooperate with the container to constitute a supplemental cover for its open front when said first mentioned cover is open, to enclose the switch mechanism within the container.

5. A switch comprising a casing having an opening, switch means in said casing including an automatic cut-out movable outwardly through said opening as the switch is opened, a pivotally mounted carrier for said switch means and its cut-out active to close said opening after passage of the cut-out therethrough and to thereby form a barrier to live switch parts, and means for locking said carrier against pivotal movement away from said opening while renewing the cut-out or otherwise placing it in condition to function.

6. A switch comprising a casing having an opening, switch means in said casing including an automatic cut-out movable outwardly through said opening as the switch is opened, a carrier for said switch means and its cut-out, active to close said opening after passage of the cut-out therethrough and to then form a barrier to live switch parts, a cover normally over said opening, and means solely under control of said cover and permanently linked thereto for locking said carrier at said opening while said cover stands open for renewing the cut-out or otherwise placing it in condition to function.

7. In a safety switch, a casing having a door, a switch in said casing formed of relatively fixed and movable sections, pivoted parallel links operatively connecting said movable switch section and the casing and preventing angling of said movable section, means cooperatively associated with at least one of said links to effect the swinging thereof to shift said movable switch section to switch opening and closing position, and other means cooperatively associating said door and one of the links for normally locking the door in closed position and for releasing the door when the movable switch section occupies its switch opening position.

8. In a safety switch, a casing having a door, a switch in said casing formed of fixed and movable sections, pivoted parallel links operatively connecting said movable switch sections and the casing, and preventing angling of said movable section, means cooperatively associated with at least one of said links to effect the swinging thereof to shift said movable section to switch opening and closing position, a door locking lug on one of said links, and a link pivoted to the door and having a longitudinal slot provided with an enlarged end cooperating with said lug whereby the latter is normally positioned in the enlarged end of said slot, but disposed for the reception thereof in the remainder of said slot when the movable switch section is shifted to switch opening position.

9. In a switch, a casing, fixed and movable switch sections in said casing, parallel links positioned to swing in substantially the same plane, spaced and pivoted at one end to separated portions of the casing and serving to prevent angling of the movable switch section, a handle on the exterior of the casing connected to one of said links for turning the same to shift the movable switch member, the connection between the handle and link permitting the latter to be thrown in advance of its moving point of engagement with the handle, and means for effecting said advance throw of the switch member when the handle has moved to a predetermined extent.

10. A switch of the character described comprising a container, relatively movable make-and-break contact members therein, the movable contact member including parallel links and a carrier pivoted at its opposite ends to relatively free ends of said links and held against angling thereby, and means for pivoting the relatively fixed ends of said links to the container, in combination with an operating handle connected axially of said relatively fixed end of at least one of the links.

11. In a switch of the character described, a container, relatively movable make-and-break contact members therein, the movable contact member including parallel links and a carrier pivoted at its opposite ends to relatively free ends of said links and held against angling thereby, and means for pivoting the relatively fixed ends of said links to the container, in combination with an operating means, a cover for the container, and locking and releasing means for said cover including a connecting member pivoted to the cover at one end and operatively connected axially of the relatively fixed pivotal end of one of the links at its other end.

12. A switch of the character described, comprising a container, relatively movable make-and-break contact members therein, the movable contact member including parallel links and a carrier pivoted at its opposite ends to end portions of said links and held against angling thereby, means connected with other portions of said links for operating the movable contact member, and means for effecting complemental locking and release of a cover, in combination with said cover.

13. In a switch, the combination with make-and-break contact members, suppporting means therefor including a movable carrier for one of the contact members, and means associated with the supporting means of one contact member for permitting the same to bodily shift without changing its angular relation with its supporting means when engaging the other contact member.

14. In a switch, the combination with relatively movable make-and-break contact members, of means for relatively mounting the same whereby to automatically align them incident to mutual engagement thereof, and for supporting them in said adjusted and aligned positions when the contact is broken.

15. In a switch, a base, a contact movable bodily with respect to said base for alignment and engagement with another contact, and spring means mounting said contact on said base and serving after separation of the contacts to frictionally hold the movable contact in any position to which it is moved by engagement of the two contacts.

16. In a switch, a base having an opening, a movable contact passing loosely through said opening for lateral shifting and having a shoulder resting frictionally against one side of said base, and spring means acting on the other side of the base and on said contact to yieldably retain the latter in the opening.

17. In a switch, a base having an opening, a movable contact passing loosely through said opening for lateral movement and having a shoulder resting frictionally against one side of said base, and a bowed spring mounted on said contact at the opposite side of the base with its ends resting against said base to yieldably hold the contact in the opening.

18. In a switch, a pair of movable contacts adapted to engage other contacts, an automatic cut-out connecting said movable contacts, a base, and means mounting said movable contacts and cut-out on said base for lateral movement bodily to allow alignment of the two sets of contacts.

19. In a switch, a base having openings, a pair of contacts passing loosely through said openings for lateral movement and having fuse clips on one end resting against one side of said base, and spring means acting on said contacts and reacting on said base to frictionally hold said clips in movable contact with the base.

20. In a safety switch, a casing having an opening in its front, a fixed base in the rear portion of said casing having binding posts and switch contacts, a movable base in the front portion of such casing parallel with said fixed base, switch blades at the rear side of said movable base and fuse holding means at the front side thereof, means mounting said switch blades on said movable base to allow bodily lateral shift of said blades when engaging said contacts without changing the angle of said blades with respect to said movable base, a pair of parallel links at each end of said movable base and pivoted thereto at one end on laterally spaced axes, the other ends of said links being pivoted to opposite sides of said casing, on similarly spaced axes, a handle on the exterior of the casing connected with one of said links for moving said movable base rearwardly to "on" position and forwardly to "off" position, said movable base closing said front opening and forming a barrier to all live parts when in the latter position, a hinged door normally closed over said casing front and said fuse holding means, and a locking link cooperatively associating said door with one of said parallel links.

In testimony whereof I have hereunto set my hand.

RALPH K. MASON.